United States Patent
Relyea

(10) Patent No.: US 9,306,937 B2
(45) Date of Patent: *Apr. 5, 2016

(54) USING A PKCS MODULE FOR OPENING MULTIPLE DATABASES

(71) Applicant: Red Hat, Inc., Raleigh, NC (US)

(72) Inventor: Robert Relyea, Sunnyvale, CA (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/562,346

(22) Filed: Dec. 5, 2014

(65) Prior Publication Data

US 2015/0095639 A1 Apr. 2, 2015

Related U.S. Application Data

(63) Continuation of application No. 12/627,865, filed on Nov. 30, 2009, now Pat. No. 8,909,916.

(51) Int. Cl.
*H04L 29/06* (2006.01)
*G06F 21/62* (2013.01)

(52) U.S. Cl.
CPC ........ *H04L 63/0823* (2013.01); *G06F 21/6218* (2013.01); *H04L 63/062* (2013.01); *H04L 63/102* (2013.01); *H04L 63/107* (2013.01); *H04L 63/168* (2013.01)

(58) Field of Classification Search
CPC . H04L 63/0823; H04L 63/168; H04L 63/107; H04L 63/062; H04L 63/102; G06F 21/6218
USPC ......................................... 713/156, 152, 167
See application file for complete search history.

(56) References Cited

U.S. PATENT DOCUMENTS

| | | | | |
|---|---|---|---|---|
| 6,205,549 B1 * | 3/2001 | Pravetz | ............... | G06F 21/6209 380/259 |
| 6,678,733 B1 * | 1/2004 | Brown | ............... | H04L 63/0209 709/203 |
| 6,697,806 B1 * | 2/2004 | Cook | ................... | G06F 21/31 |
| 6,944,183 B1 * | 9/2005 | Iyer | .................... | H04L 12/4641 370/466 |
| 6,957,199 B1 | 10/2005 | Fisher | | |
| 7,111,052 B1 * | 9/2006 | Cook | ................... | G06F 21/31 709/203 |
| 7,123,722 B2 * | 10/2006 | Filipi-Martin | ...... | H04L 63/0442 380/278 |
| 7,240,143 B1 | 7/2007 | Scheffler | | |
| 7,290,288 B2 * | 10/2007 | Gregg | ................... | G06F 21/335 705/51 |
| 7,440,962 B1 * | 10/2008 | Wong | ................ | G06F 21/6218 |
| 7,677,460 B2 * | 3/2010 | Le Crom | .............. | G06Q 20/341 235/380 |
| 7,865,959 B1 * | 1/2011 | Lewis | ................. | G06F 21/6218 726/17 |
| 7,925,890 B2 * | 4/2011 | Dever | .................. | H04L 9/3226 380/277 |
| 8,266,262 B2 * | 9/2012 | Relyea | .................... | H04L 63/10 370/230 |

(Continued)

OTHER PUBLICATIONS

USPTO Office Action for U.S. Appl. No. 12/627,876 mailed Dec. 22, 2011.

(Continued)

*Primary Examiner* — David García Cervetti
(74) *Attorney, Agent, or Firm* — Lowenstein Sandler LLP

(57) ABSTRACT

A processing device is to determine that a module, executed from a memory by the processing device, is initialized from opening a first database. The processing device is to identify a second database to be opened from a request from an application to access data that is stored in the second database. The processing device is to create, a slot, via the initialized module, to open the second database using the initialized module.

20 Claims, 4 Drawing Sheets

(56) References Cited

U.S. PATENT DOCUMENTS

| | | | |
|---|---|---|---|
| 8,909,916 B2* | 12/2014 | Relyea | H04L 63/062 713/152 |
| 2003/0076870 A1 | 4/2003 | Moon et al. | |
| 2003/0140223 A1* | 7/2003 | Desideri | H04L 63/0272 713/153 |
| 2004/0030705 A1* | 2/2004 | Bowman-Amuah | G06Q 30/02 |
| 2004/0039827 A1 | 2/2004 | Thomas et al. | |
| 2005/0069136 A1* | 3/2005 | Thornton | H04L 63/0823 380/277 |
| 2005/0091487 A1* | 4/2005 | Cross | G06F 21/10 713/165 |
| 2005/0114653 A1* | 5/2005 | Sudia | H04L 63/0823 713/158 |
| 2006/0047625 A1* | 3/2006 | Ho | G06F 21/6227 |
| 2007/0002838 A1 | 1/2007 | Komura et al. | |
| 2007/0174410 A1* | 7/2007 | Croft | G06F 3/1415 709/208 |
| 2007/0179955 A1* | 8/2007 | Croft | G06F 3/1415 |
| 2007/0180448 A1* | 8/2007 | Low | G06F 3/1415 718/1 |
| 2007/0180449 A1* | 8/2007 | Croft | G06F 3/1415 718/1 |
| 2007/0180450 A1* | 8/2007 | Croft | G06F 3/1415 718/1 |
| 2007/0180493 A1* | 8/2007 | Croft | G06F 3/1415 726/2 |
| 2007/0215710 A1* | 9/2007 | Le Crom | G06Q 20/341 235/492 |
| 2007/0283422 A1 | 12/2007 | Iyoda et al. | |
| 2008/0077803 A1* | 3/2008 | Leach | G06F 21/602 713/189 |
| 2008/0288774 A1* | 11/2008 | Mahdavi | H04L 12/5855 713/155 |
| 2009/0037121 A1 | 2/2009 | Muralidharan et al. | |
| 2009/0198618 A1* | 8/2009 | Chan | G06Q 20/02 705/66 |
| 2009/0292927 A1* | 11/2009 | Wenzel | H04L 63/0815 713/185 |
| 2009/0300027 A1 | 12/2009 | Matsunaga et al. | |
| 2009/0325491 A1* | 12/2009 | Bell | H04L 12/66 455/41.3 |
| 2010/0076988 A1 | 3/2010 | Kenedy et al. | |
| 2010/0082541 A1 | 4/2010 | Kottomtharayil | |
| 2010/0161751 A1 | 6/2010 | Stewart | |
| 2010/0235413 A1 | 9/2010 | Patel et al. | |
| 2010/0235545 A1* | 9/2010 | Gouraud | G06F 13/102 710/5 |
| 2011/0125642 A1* | 5/2011 | Kamal | G06F 17/30424 705/44 |
| 2011/0131303 A1* | 6/2011 | Relyea | H04L 63/10 709/222 |
| 2011/0131407 A1* | 6/2011 | Relyea | H04L 63/062 713/152 |
| 2013/0324478 A1* | 12/2013 | Faure | C12Q 1/6886 514/19.3 |

OTHER PUBLICATIONS

USPTO Notice of Allowance for U.S. Appl. No. 12/627,876 mailed May 10, 2012.

\* cited by examiner

USING A PKCS MODULE FOR OPENING MULTIPLE DATABASES

CROSS-REFERENCE TO RELATED APPLICATIONS

This application is a continuation of U.S. patent application Ser. No. 12/627,865, filed on Nov. 30, 2009, now issued as U.S. Pat. No. 8,909,916, which is hereby incorporated by reference in its entirety.

TECHNICAL FIELD

Embodiments of the present invention relate to establishing secure connections in a network. Specifically, the embodiments of the present invention relate to a method and system for using a public key cryptography standard (PKCS) module for opening multiple databases.

BACKGROUND

A server and a client can be protected such as with a secure socket layer (SSL) connection between the server and client. SSL is a protocol that provides security for communications over networks such as the Internet. A server may obtain a certificate for allowing an encryption key to be generated for establishing the SSL connection with a client. A certificate can contain the name of the server or other entity that is being identified, the server's public key, the name of the issuing CA, and other information proving that the certificate is authenticated. When a certificate is issued, the certificate and certificate information are typically stored in one or more databases. Other information may include a public key, a private key for decrypting encrypted content, and/or whether or not a certificate is trusted for a particular purpose (trust information). For example, a user may wish to view an encrypted email message received by the user and a client email application can search for the private key to decrypt the email.

The key may be associated with a particular cryptographic standard, such as the public key cryptography standard (PKCS), for example, the PKCS #11 industry standard. An application, such as a web browser or an email application, can construct a request for the key through a security module, such as a network security services (NSS) module, which can initialize a PKCS-based module (e.g., PKCS #11-based module) to open the database storing the security data (e.g., the key to decrypt the email). NSS can use a PKCS-based module to open a database by calling an initialization function to initialize the PKCS-based module. The PKCS industry standard allows a module to be initialized once, and while the module is initialized, other calls to use the module will produce an error. The module cannot be initialized again until the module is shut down. Therefore, a PKCS-based module cannot open additional databases until the PKCS-based module is shut down.

In addition, there is not an efficient means to share security data between applications. Typically, each application has its own database and may obtain security data and store the security data in its own database. For example, a user may use an email application and a web browsing application. The web browsing application may first request a certificate, and obtain and store the certificate in its own database. The certificate, therefore, may not be available to other applications, such as the email application.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for opening a database after a public key cryptography standard (PKCS)-based module has already been initialized. A security initialization system obtains load data that identifies a first database storing security data to be opened. The initialization system determines that the PKCS-based module for opening the first database is already initialized, where the PKCS-based module is already initialized from previously opening a second database. The initialization system causes the PKCS-based module to create a slot to open the first database, without shutting down the PKCS-based module, in response to determining that the PKCS-based module is already initialized.

The PKCS #11 industry standard allows a module to be initialized once, and while the module is initialized, other calls to use the module will produce an error. Embodiments of the present invention can open a database after a PKCS-based module (e.g., PKCS #11-based module) used to open the database has already been initialized. For example, a PKCS-based module can be initialized for a first time to open a first database. Subsequently, additional databases can be opened even while the PKCS-based module is running, without shutting down the PKCS-based module.

Figure 1:
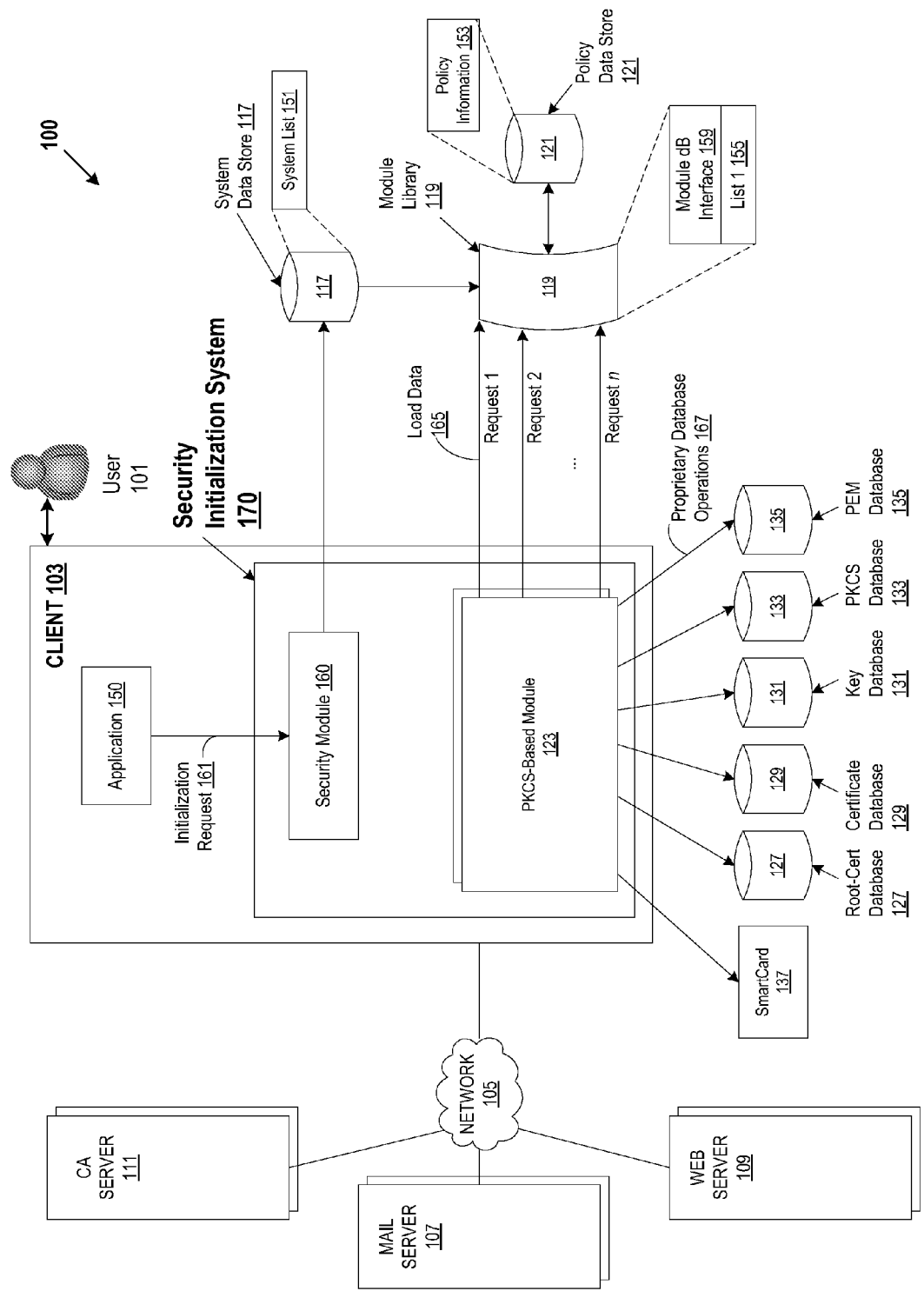
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more servers, such as mail servers 107 to process mail requests for a user 101, and one or more web servers 109 to provide web content to a user 101. The network architecture 100 can also include one or more Certificate Authority (CA) servers 111 that issue digital certificates for use by other parties, such as a user 101 or a server 107-109.

A client device 103 for a user 101 is coupled to a network 105. A user 101 can use the client device 103 to access data, such as web content or email content, hosted by a server, such as a web server 109 or a mail server 107. The user 101 can access the data using a general purpose browser or a specialized application 150. An application 150 can be a web browsing application, a cryptography application, an email application, or the like. The application 150 may need access to security data to enable a user to view content, such as an encrypted email message or encrypted web content. For example, an application 150 may be an email application which requires a key to decrypt an email message.

Security data can be stored in a data storage system. A data storage system can include data stores, file systems, tokens (e.g., a smartcard), etc. A database is an example of a data store. Examples of security data can include a root-certificate stored in a root-certificate database 127, a user certificate stored in a certificate database 129, a key stored in a key database 131, PKCS #11 objects stored in a PKCS database 133, PKCS #11 objects stored in a smartcard 137, a Privacy Enhanced Mail (PEM) file stored in a PEM database 135, a system list 151 or user list of PKCS #11 modules, etc. The databases may be part of the client computer 103 or may reside on a separate computer and accessed via network 105.

When a need for security data arises in an application 150, access to the security data can be provided through a security initialization system 170. A client device 103 can include a security initialization system 170 for opening databases that store the security data. The databases may be opened based on user-configurable policy information 153. The policy information 153 can be stored in a policy data store 121. The initialization system 170 can include a security module 160 and one or more PKCS-based modules 123 (e.g., PKCS #11-based modules). The network architecture 100 can also include a system data store 117, and a module library 119 that includes a module database (dB) interface 159. This division of functionality is presented by way of example for sake of clarity. One skilled in the art would understand that the functionality described could be combined into a monolithic component or sub-divided into any combination of components.

An application 150 can request access to security data (e.g., a key) using a security module 160, such as a network security services (NSS) module, made accessible through an operating system, such as by providing an application programming interface (API) or the like. An application 150 can generate an initialization request 161. The request 161 is received by the security module 160. It will be appreciated that the security module 160 includes a set of libraries for supporting security-enabled client and server application.

To open a database that stores the security data in response to detecting an initialization request 161, the security module 160 can access a system data store 117 to determine which database to open. The system data store 117 can store data (e.g., a system list 151) that identifies a module library 119. The module library 119 can store a module dB interface 159. The module dB interface 159 can obtain user-configurable policy information 153, for example, stored in a policy data store 121. The policy data store 121 can be a configuration file. The policy data store 121 can be a lightweight data access protocol (LDAP) based database. The LDAP-based database can be locally stored on may be part of a server (not shown) accessed via network 105. The policy information 153 can identify a database to be opened for a particular request 161 based on server type (e.g., web server, mail server), application type (e.g., email application, web browser), application name (e.g., Internet Explorer®, Firefox®), and user (e.g., root-user, administrative user). The policy information 153 can be configured by a user, such as a system administrator.

In another embodiment, the security module 160 can determine which database to open for a particular request 161 from module data that can be included in the module dB interface 159. Module data can include operating system specific lists (e.g., list 155) that identify databases to be opened for a particular initialization request 161. For example, list 155 can be a list for the Linux operating system that identifies the certificate database 129 and the root-certificate database 127 as the databases to open for a particular initialization request 161.

The security module 160 can cause a PKCS-based module 123 to be initialized for opening a database identified by the user-configurable policy information 153 or the module data (e.g., list 155). The module dB interface 159 can generate load data based on the user-configurable policy information 153 or the module data and can send the load data 165 to the PKCS-based module 123. The load data 165 can include the name of the database to be opened, the location of the database, and the access type for the database (e.g., read, write, read/write).

In cryptography, PKCS refers to a group of public key cryptography standards. Security data may be stored on a hardware cryptographic token (e.g., a smart card, USB flash drive, etc.). PKCS #11 is the Cryptographic Token Interface standard that specifies an API defining a generic interface to a cryptographic token. PKCS #11 provides an interface to one or more cryptographic devices that are active in a system (e.g., client 103) through a number of "slots" (not shown). Typically, each slot corresponds to a physical reader or other device interface for a token. A system may have some number of slots, and an application 150 can connect to tokens in any or all of those slots. PKCS #11 provides the interface to access a token through a slot.

A database storing security data or a file on disk storing security data may be perceived as a software token. The module dB interface 159 can send load data 165, which identifies which database to open, to the PKCS-based module 123. The module dB interface 159 can cause the PKCS-based module 123 to initialize for opening the database identified in the load data 165. When the PKCS-based module 123 is initialized, the PKCS-based module opens a slot for opening the database, which enables an application 150 to access the database using the opened slot.

For each database to be opened, the module dB interface 159 can send a request that includes the load data 165 to the PKCS-based module 123. For example, the module dB interface 159 can send a Request 1 to initialize the PKCS-based module 123 to cause a database, such as a certificate database 129, to open, for example, with read/write access. The load data 165 may be in a format according to the PKCS #11 industry standard. The PKCS-based module 123 can receive the load data 165 and can translate the load data 165 into a proprietary database operation 167 to cause the database (e.g., certificate database 129) to open. Examples of the PKCS-based module 123 can include a PEM module for opening PEM databases (e.g., PEM database 135) or can be a soft-token module for opening user databases and system databases. Privacy Enhanced Mail (PEM) is a protocol for securing email using public key cryptography.

Policy information 153 or module data may identify more than one database to be opened and the PKCS-based module 123 may receive more than one request to open a database (e.g., Request 1 to Request n). The PKCS #11 standard, however, allows a module to be initialized once, and while the module is running, other calls to use the module will produce an error. For example, after the PKCS-based module 123 is initialized in response to Request 1, which opened the certificate database 129 with read/write access, the PKCS-based module 123 may receive Request 2 to open a different database, such as a key database 131 with read/write access, while the PKCS-based module 123 is still running The PKCS-based module 123 can generate an error (e.g., error code) indicating that the PKCS-based module 123 is already initialized (opened). Since the PKCS-based module 123 is already initialized, the PKCS-based module 123 cannot open a slot to enable an application 105 to access a database (e.g., key database 131) for Request 2. The security module 160 can detect the error (e.g., error code) to determine that the PKCS-based module 123 is already initialized. In response to determining that the PKCS-based module 123 is already initialized, the security module 160 can cause the PKCS-based module 123 to create a slot to open the database (e.g., key database 131) which would enable an application 150 to access the opened database. For an additional request, such as Request n, the PKCS-based module 123 can create an additional slot to open a database for Request n. The PKCS-based module 123 can create one slot for each database to be opened.

A CA server 111, mail server 107, and web server 109 can be any type of computing device including server computers, desktop computers, laptop computers, hand-held computers, or similar computing device. A client device 103 can be a smart hand-held device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

Security data can be stored in databases (e.g., root-certificate database 127, certificate database 129, key database 131, PKCS database 133, PEM database 135) in one or more persistent storage units. These databases may be separate or combined databases. System lists 151 can be stored in a system data store 117 in a persistent storage unit. User-configurable policy information 153 can be stored in a policy data store 121 in a persistent storage unit. A data store can be a table, a database, a file, etc. A module dB interface 159 can be stored in a module library 119 in a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

The security module 160, the PKCS-based module 123, and the module dB interface 159 can be implemented as hardware, computer-implemented software, firmware or a combination thereof. In one embodiment, the security module 160, the PKCS-based module 123, and the module dB interface 159 comprise instructions stored in memory 404 that cause a processing device 402 in FIG. 4 described in greater detail below to perform the functions of the security module 160, the PKCS-based module 123, and the module dB interface 159.

Figure 2:
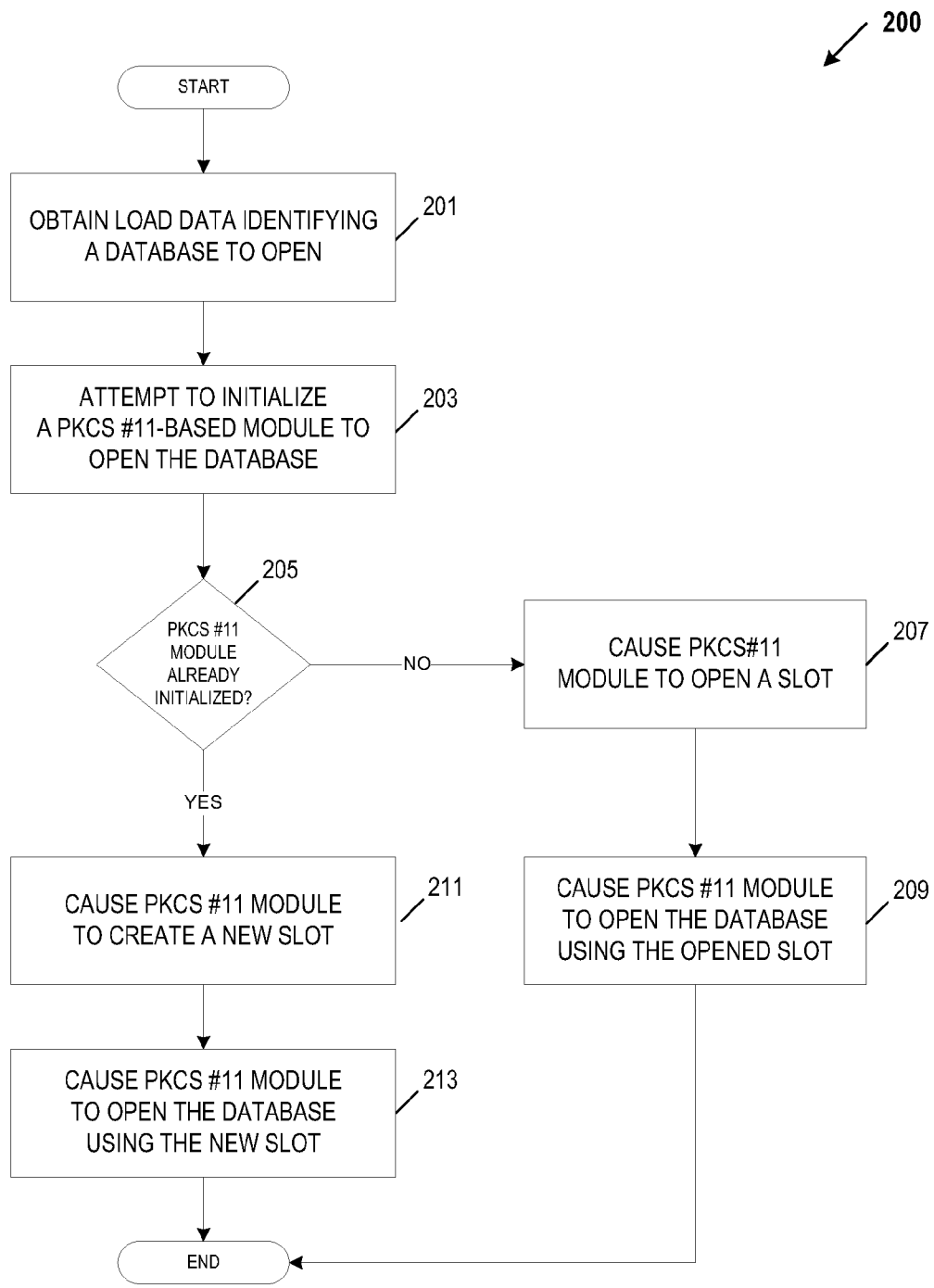
FIG. 2 is a flow diagram which illustrates an embodiment of a method for using a public key cryptography standard (PKCS) module for opening multiple databases.

FIG. 2 is a flow diagram which illustrates an embodiment of a method 200 for initializing databases to access security data. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the security module 160 in a client machine 103 of FIG. 1.

In one embodiment, the method 200 can be invoked upon the security module receiving a request from an application for access to security data stored in a database (e.g., a key stored in a key database). In response, the security module obtains load data that identifies a database that stores security data to be opened at block 201. The load data can include a name of the database to open, the location of the database, and the type of access for the database. For example, the security module may obtain load data identifying two databases to be opened, such as a certificate database as a first database to be opened with read/write access and a key database as a second database to be opened with read/write access. The load data can be obtained from user-configurable policy information, for example, stored in a LDAP-based database, or from module data, for example, stored in a module library. One embodiment of a method for identifying databases to open based on user-configurable policy information is discussed in greater detail below in conjunction with FIG. 3.

At block 203, the security module can attempt to initialize a PKCS-based module to open the first database (e.g., a certificate database) and can determine whether the PKCS-based module is already initialized at block 205. If the PKCS-based module is not already initialized (block 205), the security module can cause the PKCS-based module to initialize at block 207. The initialization of the PKCS-based module will open a slot. At block 209, the security module can cause the PKCS-based module to open the identified database using the opened slot. For example, the PKCS-based module can open the first database (e.g., the certificate database) using the opened slot. The PKCS-based module can open the database based on the load data. For example, the PKCS-based module can open the certificate database with read/write access.

If the PKCS-based module is already initialized (block 205), the security module can cause the PKCS-based module to create a new slot at block 211. The PKCS-based module can generate an error (e.g., error code) if the PKCS-based module is already initialized and the security module can detect the error (e.g., error code). For example, the PKCS-based module may already be initialized from previously opening the first database (e.g., the certificate database). Subsequently, the security module may attempt to initialize the PKCS-based module to open a second database (e.g., a key database). If the PKCS-based module has not been shut down from the previous initialization for opening the first database, the security module's attempt to initialize the PKCS-based module will result in an error message (e.g., error code).

At block 211, in response to detecting that the PKCS-based module is already initialized, the security module can cause the PKCS-based module to create a new slot for opening the second database. In on embodiment, a new slot for opening the database is created via a create object call to create a special object, such as, CKO_NEW_SLOT. The security module can perform the call to cause the PKCS-based module to create the new slot. At block 213, security module can cause the PKCS-based module to open the second database (e.g., the key database) using the new slot without shutting down the PKCS-based module and the method ends.

Figure 3:
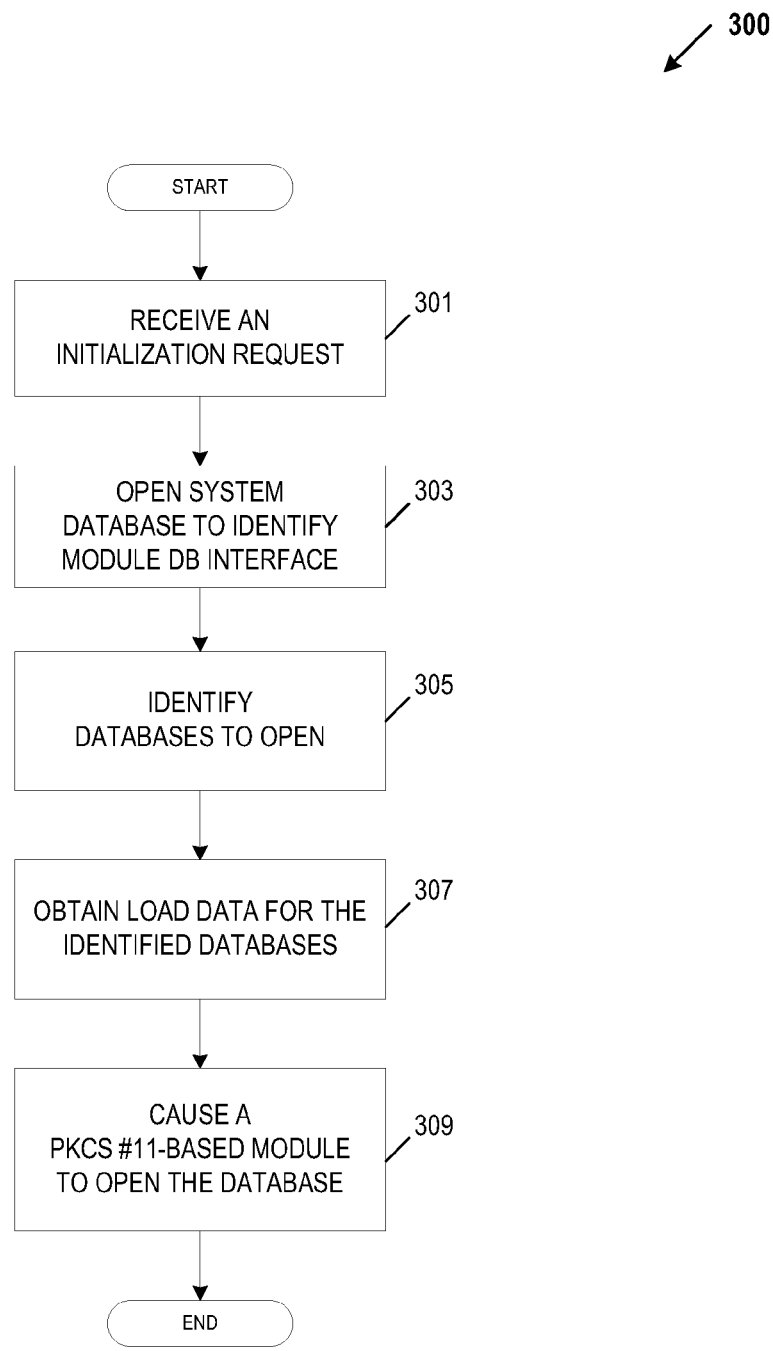
FIG. 3 is a flow diagram which illustrates an embodiment of a method for identifying databases to open based on user-configurable policy information.

FIG. 3 is a flow diagram which illustrates an embodiment of a method 300 for identifying databases to open based on user-configurable policy information. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the security initialization system 170 in a client machine 103 of FIG. 1.

In one embodiment, the method 300 can be invoked upon the security initialization system receiving an initialization request from an application to access security data at block 301. A request can include, for example, the type of server hosting the data (e.g., mail server, web server), the application type (e.g., email application, web browser, etc.), the application name (e.g., Internet Explorer®, Firefox®), and the user (e.g., a root user, administrator user). At block 303, the initialization system can open a system data store. The system data store stores data (e.g., a list) that identifies a module interface (e.g., module db interface 159 in FIG. 1).

At block 305, the initialization system can identify which databases to open. In one embodiment, the initialization system can access user-configurable policy information that identifies which databases to open. The initialization system can cause module dB interface (identified at block 303) to access user-configurable policy information stored in a database, such as a LDAP-based database. The user-configurable policy information can identify which databases to open based on the server type, the application type, the application name, the user, etc. For example, a system administrator can configure a policy that identifies a user database, a database that has the root-certificates, a user list of smart cards, and a system list of smart cards to be opened if the application is a Linux application.

In another embodiment, the initialization system can identify which databases to open based on module data (e.g., list 155 stored in module library 119 in FIG. 1). The module data can be operating system specific. For example, the module data for the Linux operating system may include a list that identifies the system database, the user database, and the databases that have all of the root-certificates to be opened.

At block 307, the initialization system can obtain load data for the identified databases. The module db interface can generate load data based on the policy information or module data and the initialization system can obtain the load data from the module db interface. The load data can include the name of the database to open, the location of the database, and data identifying whether to open a database for read access, write access, or read/write access.

At block 309, the initialization system can cause a PKCS-based module to open a slot or create a new slot for opening the identified database and the method ends. The initialization system can send the load data to the PKCS-based module causing the PKCS-based module to open the database based on the load data (e.g., opening a database as read only).

Figure 4:
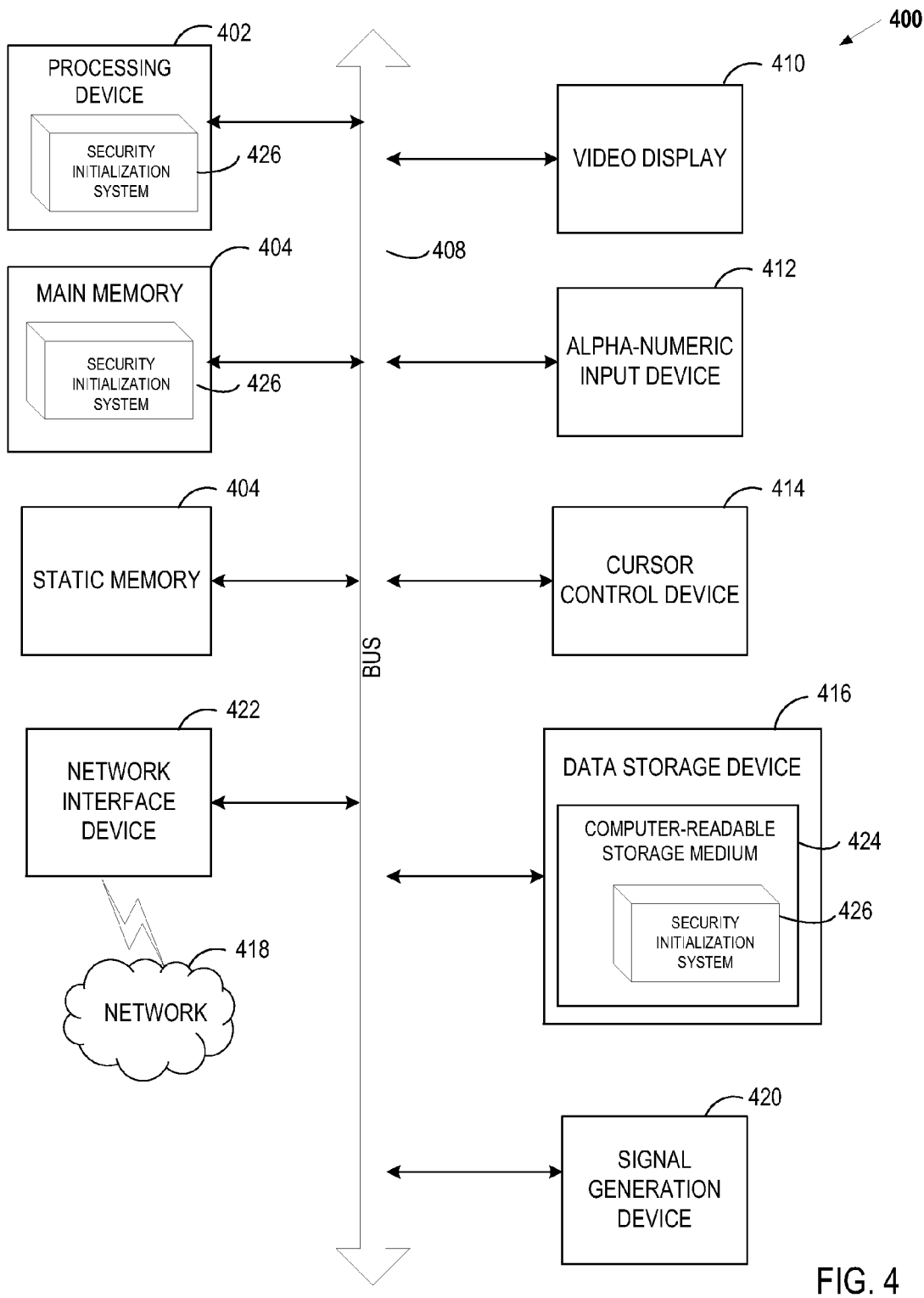
FIG. 4 is a diagram of one embodiment of the security initialization system.

FIG. 4 is a diagram of one embodiment of a computer system for identifying databases to initialize based on user-configurable policy information and initializing the databases to access security data. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the security initialization system 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the security initialization system 426) embodying any one or more of the methodologies or functions described herein. The security initialization system 426 may also reside, completely or at least partially, within the main memory 404 and/or within the processing device 402 during execution thereof by the computer system 400, the main memory 404 and the processing device 402 also constituting machine-readable storage media. The security initialization system 426 may further be transmitted or received over a network 418 via the network interface device 422.

The computer-readable storage medium 424 may also be used to store the security initialization system 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The security initialization system 426, components and other features described herein (for example in relation to FIG. 1) can be implemented as discrete hardware components or integrated in the functionality of hardware components such as ASICS, FPGAs, DSPs or similar devices. In addition, the security initialization system 426 can be implemented as firmware or functional circuitry within hardware devices. Further, the security initialization system 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "determining," "causing," "receiving," "opening," "attempting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for identifying databases to initialize based on user-configurable policy information and initializing the databases to access security data has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining that a module, executed from a memory by a processing device, is initialized from opening a first database;
   identifying a second database to be opened from a request from an application to access data that is stored in the second database; and
   creating, by the processing device, a slot, via the initialized module, to open the second database using the initialized module.

2. The method of claim 1, wherein the module comprises a PKCS-based module.

3. The method of claim 1, wherein identifying the second database comprises:
   receiving load data that identifies the second database, the load data being in view of user-configurable policy information.

4. The method of claim 3, wherein the user-configurable policy information is stored in a lightweight directory access protocol (LDAP)-based database.

5. The method of claim 3, wherein the user-configurable policy information identifies a database to be opened in view of at least one of: server type, application type, application name, or user.

6. The method of claim 3, wherein receiving the load data comprises:
   receiving an initialization request to access security data stored in a database;
   opening a system database in response to receiving the initialization request, wherein the system database identifies a module database interface;
   accessing, via the module database interface, user-configurable policy information stored in an LDAP-based database; and
   obtaining the load data to open the second database.

7. The method of claim 1, wherein determining that the module is initialized comprises:
   attempting to initialize the module; and
   receiving an error code indicating that the module is already initialized.

8. The method of claim 1, wherein the module comprises at least one of a soft-token module to open a database storing security data or a Privacy Enhanced Mail (PEM) module to open a database storing a PEM file.

9. The method of claim 1, wherein the data comprises at least one of a key, a certificate, or a Privacy Enhanced Mail (PEM) file.

10. A system comprising:
    a memory; and
    a processing device operatively coupled to the memory, the processing device to:
       determine that a module, executed from the memory by the processing device, is initialized from opening a first database;

identify a second database to be opened from a request from an application to access data that is stored in the second database; and create, by the processing device, a slot, via the initialized module, to open the second database using the initialized module.

11. The system of claim 10, wherein the module comprises a PKCS-based module.

12. The system of claim 10, wherein the processing device is to identify the second database by:

receiving load data that identifies the second database, the load data being based on user-configurable policy information.

13. The system of claim 12, wherein the user-configurable policy information identifies a database to be opened based on at least one of: server type, application type, application name, and user.

14. The system of claim 12, wherein to receive the load data, the processing device is to:

receive an initialization request to access security data stored in a database;

open a system database in response to receiving the initialization request, wherein the system database identifies a module database interface;

access, via the module database interface, user-configurable policy information stored in an LDAP-based database; and obtain the load data to open the second database.

15. The system of claim 10, the processing device to:
attempt to initialize the module; and
receive an error code indicating that the module is already initialized.

16. The system of claim 10, wherein the data comprises at least one of a key, a certificate, or a Privacy Enhanced Mail (PEM) file.

17. A non-transitory computer-readable medium comprising instructions encoded thereon that, when executed by a processing device, cause the processing device to:

determine that a module, executed from the memory by the processing device, is initialized from opening a first database;

identify a second database to be opened from a request from an application to access data that is stored in the second database; and create, by the processing device, a slot, via the initialized module, to open the second database using the initialized module.

18. The non-transitory computer-readable medium of claim 17, wherein to identify the second database, the processing device is to:

receive load data that identifies the second database, the load data being in view of user-configurable policy information.

19. The non-transitory computer-readable medium of claim 18, wherein to receive the load data, the processing device is to:

receive an initialization request to access security data stored in a database;

open a system database in response to receiving the initialization request, wherein the system database identifies a module database interface;

access, via the module database interface, user-configurable policy information stored in an LDAP-based database; and obtain the load data for opening the second database.

20. The non-transitory computer-readable medium of claim 17, wherein to determine that the module is initialized, the processing device is to:

attempt to initialize the module; and
receive an error code indicating that the module is already initialized.

* * * * *